United States Patent
Miyamoto et al.

(10) Patent No.: US 11,433,585 B2
(45) Date of Patent: Sep. 6, 2022

(54) METHOD FOR MANUFACTURING RESIN PIPE JOINT

(71) Applicant: NIPPON PILLAR PACKING CO., LTD., Osaka (JP)

(72) Inventors: Masaki Miyamoto, Osaka (JP); Masateru Yamada, Osaka (JP); Kazukiyo Teshima, Osaka (JP); Hiroki Sakamoto, Osaka (JP); Toshihide Iida, Osaka (JP); Tomoyuki Koike, Osaka (JP); Motoaki Naruo, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 675 days.

(21) Appl. No.: 16/322,323

(22) PCT Filed: Jun. 15, 2017

(86) PCT No.: PCT/JP2017/022139
§ 371 (c)(1),
(2) Date: Jan. 31, 2019

(87) PCT Pub. No.: WO2018/025519
PCT Pub. Date: Feb. 8, 2018

(65) Prior Publication Data
US 2019/0193315 A1    Jun. 27, 2019

(30) Foreign Application Priority Data
Aug. 2, 2016  (JP) .............................. JP2016-151712

(51) Int. Cl.
*B29C 45/26* (2006.01)
*B29C 45/00* (2006.01)
(Continued)

(52) U.S. Cl.
CPC .......... *B29C 45/2602* (2013.01); *B29C 45/00* (2013.01); *B29C 45/34* (2013.01);
(Continued)

(58) Field of Classification Search
CPC . B29C 45/00; B29C 45/2602; B29C 45/2614; B29C 45/34; B29C 45/44;
(Continued)

(56) References Cited

U.S. PATENT DOCUMENTS 4,410,479 A * 10/1983 Cyriax .................... F16L 47/08
264/255
5,743,572 A    4/1998 Nishio
(Continued)

FOREIGN PATENT DOCUMENTS

EP    0 139 176 A1    5/1985
EP    2 187 106 A1    5/2010
(Continued)

OTHER PUBLICATIONS

EP 0139176—Machine Translation (Year: 1985).*
(Continued)

*Primary Examiner* — Yunju Kim
(74) *Attorney, Agent, or Firm* — Oblon, McClelland, Maier & Neustadt, L.L.P.

(57) ABSTRACT

A method for manufacturing a resin pipe joint with a joint body includes the following steps. Preparing a mold and a supply device configured to supply molten resin. The mold includes a first mold for an outer shape of the joint body and a second mold for an inner shape of the joint body. Combining the second mold with the first mold to form a cavity, into which the molten resin is injectable, inside the mold. Supplying the molten resin to the cavity in the mold. Solidifying the molten resin in the cavity after stop of the supply of the molten resin from the supply device. The
(Continued)

second mold has a gap that connects the cavity to a discharge space outside the cavity and allows gas to flow.

3 Claims, 10 Drawing Sheets

(51) Int. Cl.
*B29C 45/34* (2006.01)
*F16L 21/08* (2006.01)
*F16L 47/04* (2006.01)
*F16L 47/10* (2006.01)

(52) U.S. Cl.
CPC .............. *F16L 21/08* (2013.01); *F16L 47/041* (2019.08); *F16L 47/10* (2013.01)

(58) Field of Classification Search
CPC .............. B29C 45/261; B29C 45/2612; B29C 45/2616; B29C 33/005; B29C 33/10; B29C 33/302; B29L 2031/24; F16L 21/08; F16L 33/223; F16L 47/041; F16L 47/10
See application file for complete search history.

(56) References Cited

U.S. PATENT DOCUMENTS

| | | | |
|---|---|---|---|
| 7,153,125 B2 * | 12/2006 | Evans | ............... F16L 43/008 |
| | | | 425/441 |
| 2017/0159854 A1 | 6/2017 | Fujii et al. | |

FOREIGN PATENT DOCUMENTS

| | | |
|---|---|---|
| JP | 55-42572 U1 | 3/1980 |
| JP | 10-54489 A | 2/1998 |
| JP | 2015-193100 A | 11/2015 |
| WO | WO 2009/025136 A1 | 2/2009 |
| WO | WO 2016/052223 A1 | 4/2016 |

OTHER PUBLICATIONS

JP 2015193100—Machine Translation (Year: 2015).*
WO 2009025136—Machine Translation (Year: 2009).*
Korean Office Action dated Apr. 9, 2020 in Korean Patent Application No. 10-2019-7001941 (with English translation), 11 pages
Combined Chinese Office Action and Search Report dated Jun. 28, 2020 in corresponding Chinese Patent Application No. 201780044086.X (with English Translation), 13 pages
Extended European Search Report dated Feb. 18, 2020, in Patent Application No. 17836626.6, 7 pages
International Search Report dated Aug. 29, 2017 in PCT/JP2017/022139 filed on Jun. 15, 2017.
Shashutsu Seikei Jiten Henshu Iinkai, (7) Air Vent, Shashutsu Seikei Jiten, First Edition, Sangyo Chosakai Jiten Shuppan Center, Apr. 27, 2002, p. 273 (with translation), total 3 pages.

* cited by examiner

PRIOR ART

METHOD FOR MANUFACTURING RESIN PIPE JOINT

TECHNICAL FIELD

The present invention relates to a method for manufacturing a resin pipe joint.

BACKGROUND ART

A conventional resin pipe joint with a joint body is known as described in Patent Document 1. Such a resin pipe joint (joint body) is manufactured by injection molding or the like. For example, as shown in FIG. 10, a mold 201 and a supply device 202 for supplying molten resin to the mold 201 are prepared for manufacture of the resin pipe joint.

The mold 201 includes a hollow first mold 211 and pin-shaped second molds 212. The second molds 212 are combined with the first mold 211 to form a cavity 218, into which the molten resin from the supply device 202 can be injected, inside the mold 201.

The second molds 212, when combined with the first mold 211, are held by the first mold 211 to be placed inside openings of the first mold 211 to close the openings, and thus, define the cavity 218 inside the mold 201. Each second mold 212 is a simple item.

When molten resin is injected into the cavity 218, gas generated in the cavity 218 due to the injection and/or gas (air) existing in the cavity 218 before the supply of the molten resin often fail to escape from the cavity 218 and unnecessarily stay in the cavity 218.

Thus, molding defect can occur caused by insufficient filling of the cavity 218 with molten resin, roughening of the surface of a molded article formed by solidifying molten resin inside the cavity 218, and the like. That is, there is a risk of deterioration in quality of the resin pipe joint, esp. its joint body.

As a method for avoiding insufficient filling of the cavity 218 with molten resin, increasing filling pressure of molten resin is considered. This method has, however, a problem of appearance defect of a product, the resin pipe joint (esp. its joint body). For example, a flow mark can be left on the surface of the molded article.

PRIOR ART DOCUMENT

Patent Document

Patent Document 1: Japanese Unexamined Patent Application Publication No. H10-054489 A

SUMMARY OF THE INVENTION

The present invention has been made in view of such circumstances, and an object of the present invention is to provide a method for manufacturing a higher-quality resin pipe joint.

According to one aspect of the present invention, a method for manufacturing a resin pipe joint is a method for manufacturing a resin pipe joint with a joint body connectable to a tube. The joint body includes a plurality of ports and a fluid channel that connects the ports to each other. The method includes the following steps. Preparing a mold and a supply device configured to supply molten resin to the mold. The mold includes a first mold for an outer shape of the joint body and a second mold for an inner shape of the joint body. Combining the second mold with the first mold to form a cavity, into which molten resin from the supply device is injectable, inside the mold. Supplying molten resin from the supply device to the cavity in the mold. Solidifying molten resin in the cavity after stop of the supply of molten resin from the supply device. The second mold has an outer periphery with a gap that connects the cavity to a discharge space outside the cavity and allows gas to flow when the second mold is combined with the first mold.

According to this method, when molten resin is supplied to the mold and infiltrated into the cavity, gas generated in the cavity due to the injection of molten resin and/or gas (air) existing in the cavity before the supply of molten resin can escape to a discharge space of the cavity through the gap.

Therefore, the above-mentioned unnecessary gas is prevented from staying in the cavity when molten resin is supplied to the cavity. This can ensure favorable filling of the cavity with molten resin and reduce risk of molding defects. As a result, it is possible to improve the quality of the joint body and further the resin pipe joint.

According to another aspect of the present invention, the second mold includes a shaft-shaped inner mold and an annular outer mold disposed around the inner mold so that the gap is placed between the inner mold and the outer mold.

According to a further aspect of the present invention, the resin pipe joint includes an inner ring coupled to the joint body to connect the tube to at least one of the ports of the joint body. The inner ring constitutes a sealing region for sealing space between the inner ring and the joint body in cooperation with the joint body. When the cavity is formed, the second mold is combined with the first mold so that the gap communicates with the cavity at a location in the cavity that does not face a region for forming a constituent part of the sealing region in the joint body.

According to yet another aspect of the present invention, the resin pipe joint includes an inner ring and a union nut. The inner ring is press-fitted into a longitudinal end of the tube and coupled to the joint body to connect the tube to at least one of the ports of the joint body. The union nut is fastened to the joint body to maintain the inner ring, which is press-fitted in the longitudinal end of the tube, at a position where the inner ring is coupled to the joint body. The joint body includes a main sleeve, an outer sleeve, an inner sleeve, and a groove. The main sleeve includes a part of the fluid channel. The outer sleeve includes a thread on an outer periphery. The thread is engageable with the union nut. The outer sleeve is projected from the main sleeve coaxially in a first axial direction of the main sleeve. The inner sleeve is disposed inside the outer sleeve and projected from the main sleeve coaxially in the same direction as the outer sleeve so that a tip of the inner sleeve is closer to the main sleeve than a tip of the outer sleeve. The groove is surrounded by the main sleeve, the outer sleeve, and the inner sleeve and open in the first axial direction. The inner ring includes a tubular insert portion, a tubular fitting portion, a tubular plug portion, and a tubular contact portion. The insert portion is insertable into the outer sleeve. The fitting portion is projected from the insert portion in the first axial direction and to be press-fitted into one longitudinal end of the tube. The plug portion is coaxially projected from the insert portion in a second axial direction and to be press-fitted into the groove to form a first sealing region between the plug portion and an outer periphery of the inner sleeve. The contact portion is disposed inside the plug portion and projected from the insert portion in the same direction as the plug portion so that a tip of the contact portion is closer to the insert portion than a tip of the plug portion. The contact portion is to be pressed against the tip of the inner sleeve to form a second sealing region between the contact portion and the tip of the inner sleeve.

According to yet another aspect of the present invention, when the cavity is formed, the second mold is combined with the first mold under the condition that the gap is so positioned that the outer periphery of the inner sleeve to constitute the first sealing region can be formed solely by the outer mold of the second mold and that the tip of the inner sleeve to constitute the second sealing region can be formed solely by the inner mold of the second mold.

According to still another aspect of the present invention, the molten resin is a fluororesin material.

The present invention can provide a method for manufacturing a higher-quality resin pipe joint.

DESCRIPTION OF THE EMBODIMENTS

First, a schematic configuration of a resin pipe joint manufactured according to the first embodiment of the present invention will be described with reference to the drawings.

Figure 1:
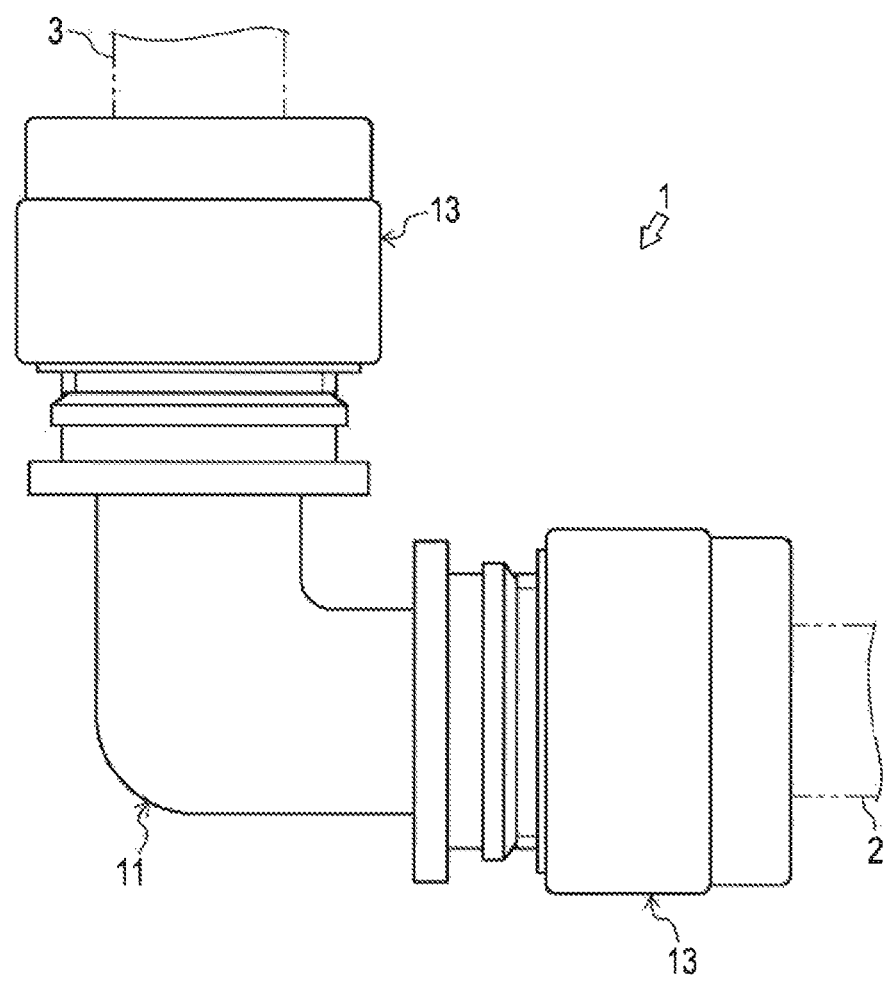
FIG. 1 is a front view of a resin pipe joint manufactured by a method according to a first embodiment of the present invention.
Figure 2:
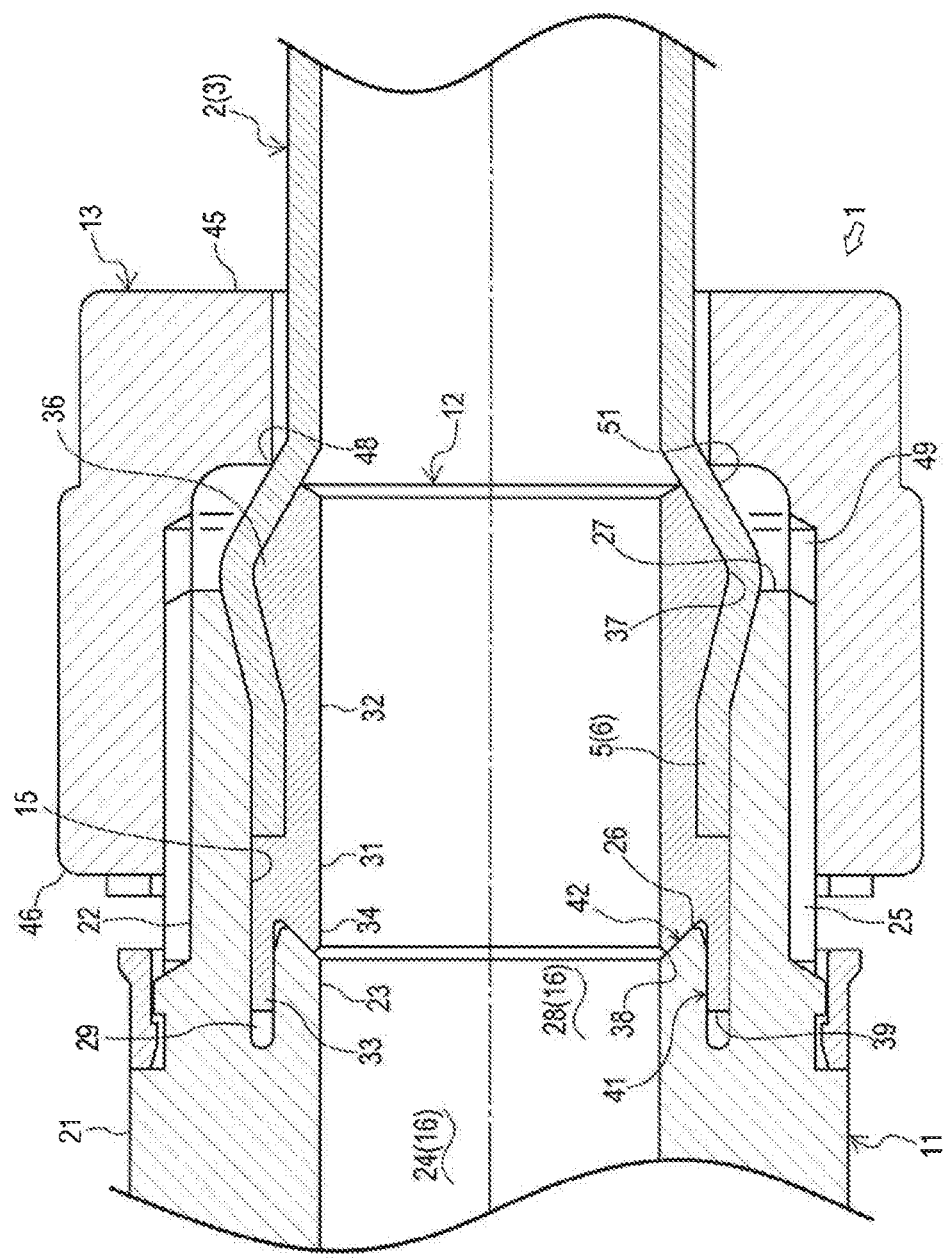
FIG. 2 is a sectional view of a part of the resin pipe joint of FIG. 1 connected with a tube.

FIG. 1 is a front view of a resin pipe joint 1 manufactured by a method according to the first embodiment of the present invention. FIG. 2 is a sectional view of a part of the resin pipe joint 1 connected to tubes 2 and 3.

The resin pipe joint 1 can be used in a manufacturing apparatus for semiconductors, liquid crystal devices, organic LEDs, or the likes. When used in these apparatus, the resin pipe joint 1 is, for example, placed between the first tube 2 and the second tube 3, as shown in FIG. 1, and connected to the tubes 2 and 3.

The resin pipe joint 1 is an elbow (L-shaped) type as shown in FIG. 1. The resin pipe joint 1 has connection ends connectable to the tubes 2 and 3. Each connection end can be connected to the tube 2 or 3 by using a connection structure as shown in FIG. 2.

A resin pipe joint that can be manufactured by the present invention is not limited to the elbow-type resin pipe joint 1 of the first embodiment, but can be, for example, a straight-type resin pipe joint with connection ends linearly connectable to two tubes (i.e. a union-type resin pipe joint), or a T-shaped resin pipe joint with connection ends connectable to three tubes (tee-type resin pipe joint).

As shown in FIGS. 1 and 2, the resin pipe joint 1 includes a joint body 11, a plurality of (two in this case) inner rings 12, and a plurality of (two in this case) union nuts 13. Here, the tube 2 (and 3) has flexibility and is made from resin material (preferably fluororesin material).

The joint body 11 includes a plurality of ports 15 and a fluid channel 16 that connects the ports 15 to each other. The ports 15 are provided to the joint body 11 to be exposed outside the joint body 11 and located at the connection ends.

The different ports 15 are open in different directions. The ports 15 are formed to allow the tubes 2 and 3 to be inserted thereinto. The fluid channel 16 extends between the ports 15 inside the joint body 11.

The joint body 11 is made of a resin material, preferably, a fluororesin material, for example, perfluoroalkoxy fluorine resin (PFA).

The joint body 11 includes a main sleeve 21, an outer sleeve 22, and an inner sleeve 23. The outer sleeve 22 and the inner sleeve 23 are placed near each of the ports 15. The joint body 11 can be coupled to the inner rings 12 to connect the fluid channel 16 with the inside of the tubes 2 and 3 via the inner rings 12.

The main sleeve 21 has a circular cylindrical shape and extends between the connection ends. The main sleeve 21 includes a first fluid channel 24 constituting a part of the fluid channel 16. The first fluid channel 24 has a substantially circular cross section and extends in the axial direction of the main sleeve 21.

The outer sleeve 22 has a circular cylindrical shape and a thread 25 on its outer periphery. The thread 25 is engageable with the union nut 13 and projected from the main sleeve 21 coaxially in a first axial direction. The thread 25 is a male screw and extends along the axial direction of the outer sleeve 22.

The inner sleeve 23 is disposed inside the outer sleeve 22. The inner sleeve 23 is projected from the main sleeve 21 coaxially in the same direction as the outer sleeve 22 so that a tip 26 of the inner sleeve 23 is closer to the main sleeve 21 than a tip 27 of the outer sleeve 22.

The inner sleeve 23 has a circular cylindrical shape, an inner diameter substantially equal to that of the main sleeve 21, and an outer diameter smaller than the inner diameter of the outer sleeve 22. The inner sleeve 23 includes a second fluid channel 28 constituting a part of the fluid channel 16. The second fluid channel 28 has a substantially circular cross section and extends from the first fluid channel 24 in the same direction as the first fluid channel 24.

The joint body 11 further includes a groove 29 surrounded by the main sleeve 21, the outer sleeve 22, and the inner sleeve 23 to open in the first axial direction. The groove 29 has an annular shape and extends along the entire circumference of the outer peripheral surface of the inner sleeve 23 to allow a plug portion 33 of the inner ring 12 to be press-fitted thereinto.

The inner rings 12 can be coupled to the joint body 11 to connect the tubes 2 and 3 to the ports 15 of the joint body 11. Each of the inner rings 12 forms part of sealing regions (a first sealing region 41 and a second sealing region 42) that seal space between the inner rings 12 and the joint body 11 when they are coupled to each other.

The inner rings 12 are made of a resin material, preferably, a fluororesin material such as PFA or polytetrafluoroethylene (PTFE). The inner rings 12 can be made of a resin material that is the same as or different from the resin material of the joint body 11.

The inner ring 12 has a fluid channel connectable with the fluid channel 16 of the joint body 11 and the inside of the tubes 2 and 3. The fluid channel has a substantially circular cross section and extends in the axial direction. The inner ring 12 includes an insert portion 31, a fitting portion 32, the plug portion 33, and a contact portion 34.

The insert portion 31 has a tubular shape and can be inserted into the outer sleeve 22 of the joint body 11. The insert portion 31 has a circular cylindrical shape, an outer diameter larger than the inner diameter of the tube 2 or 3, and an inner diameter substantially equal to the inner diameter of the inner sleeve 23 of the joint body 11 and the inner diameter of the tubes 2 and 3.

The fitting portion 32 has a tubular shape, is projected in the first axial direction from the insert portion 31, and can be press-fitted into a longitudinal end 5 or 6 of the tube 2 or 3. The fitting portion 32 has a circular cylindrical shape and an inner diameter substantially equal to the inner diameter of the insert portion 31 and the inner diameter of the tubes 2 and 3.

The fitting portion 32 has an outer diameter smaller than the outer diameter of the insert portion 31 and larger than the inner diameter of the tubes 2 and 3. The fitting portion 32 can be inserted into the outer sleeve 22 of the joint body 11 together with the longitudinal end 5 or 6 of the tube 2 or 3, while the fitting portion 32 is press-fitted in the longitudinal end 5 or 6.

The fitting portion 32 includes a bulging portion 36. The bulging portion 36 aims at favorable sealing properties and retainability when the fitting portion 32 is press-fitted into the longitudinal end 5 or 6 of the tube 2 or 3. The bulging portion 36 has a shape to bulge the longitudinal end 5 or 6 radially outside of the fitting portion 32.

The bulging portion 36 has a cross section with a convex profile so that the bulging portion 36 has a tapered first outer peripheral surface and a tapered second outer peripheral surface, which extend the first and second axial directions from a top portion 37, respectively. The first outer peripheral surface of the bulging portion 36 can be pressed by the union nut 13 across the tube 2 or 3.

The plug portion 33 has a tubular shape and is projected from the insert portion 31 coaxially in the second axial direction. The plug portion 33 can be press-fitted into the groove 29 so that the first sealing region 41 forms between the plug portion 33 and the outer periphery of the inner sleeve 23. The plug portion 33 has a circular cylindrical shape, and an inner diameter larger than the inner diameter of the insert portion 31.

The contact portion 34 has a tubular shape and is disposed inside the plug portion 33. The contact portion 34 is projected from the insert portion 31 coaxially in the same direction as the plug portion 33 so that a tip 38 of the contact portion 34 is closer to the insert portion 31 than a tip 39 of the plug portion 33.

The contact portion 34 can be pressed against the tip 26 so that the second sealing region 42 forms between the contact portion 34 and the tip 26 of the inner sleeve 23. The contact portion 34 can restrict a radially inward deformation of the inner sleeve 23 pushed by the plug portion 33 when the plug portion 33 is press-fitted into the groove 29.

The contact portion 34 has a circular cylindrical shape and an inner diameter substantially equal to the inner diameter of the insert portion 31. The contact portion 34 has an outer diameter smaller than the inner diameter of the plug portion 33 so that the tip 26 of the inner sleeve 23 can be sandwiched between the contact portion 34 and the first axial side of the plug portion 33.

The contact portion 34 has a tapered shape so that its outer diameter gradually decreases from the first axial side to the second axial side. More specifically, the outer peripheral surface of the contact portion 34 has a tapered shape that can contact a tapered contact surface included in the tip 26 of the inner sleeve 23.

The union nut 13 can be fastened to the joint body 11 so that the union nut 13 maintains the inner ring 12, which is press-fitted in the longitudinal end 5 or 6 of the tube 2 or 3, to be coupled to the joint body 11. The union nut 13 can be loosely fitted into the tube 2 or 3.

The union nut 13 is made of a resin material, preferably, a fluororesin material such as PFA or PTFE. The union nut 13 can be made of a resin material the same as or different from the joint body 11.

The union nut 13 has a through hole that allows the tube 2 or 3 to pass therethrough. The union nut 13 can continue to press the tube 2 or 3 toward the inner ring 12 while allowing the tube 2 or 3 to pass through the through hole. The union nut 13 includes a pressing portion 45 and an outer ring portion 46.

The pressing portion 45 has a tubular shape that allows the tube 2 or 3 to be placed inside such that the pressing portion 45 can move in the longitudinal direction of the tube 2 or 3. The pressing portion 45 has a circular cylindrical shape and an inner diameter slightly larger than the outer diameter of the tube 2 or 3. The pressing portion 45 includes a corner portion 48 on the inner diameter side of the second axial end.

The outer ring portion 46 is screwed to the thread 25 of the outer sleeve 22 from the outer radius. The outer ring portion 46 is coaxially projected from the outer periphery of the second axial end of the pressing portion 45 to the second axial direction. The outer ring portion 46 has a circular cylindrical shape and an inner diameter larger than the inner diameter of the pressing portion 45.

The outer ring portion 46 has the inner diameter to be able to surround the outer sleeve 22. The inner periphery of the outer ring portion 46 has a thread 49 engageable with the thread 25 of the outer sleeve 22. The thread 49 is a female screw and extends along the axial direction of the outer ring portion 46.

The union nut 13 is fastened by the outer ring portion 46 screwed to the outer sleeve 22, and thus the pressing portion 45 can press an enlarged radius part 51 of the tube 2 or 3, which is formed by the bulging portion 36 of the inner ring 12, toward the bulging portion 36 by using the corner portion 48.

When the tube 2 or 3 is to be connected to the resin pipe joint 1 as described above, first, the union nut 13 is loosely fitted to the tube 2 or 3. Next, in order to couple the inner ring 12 to the tube 2 or 3, the fitting portion 32 and the bulging portion 36 are press-fitted into the longitudinal end 5 or 6 of the tube 2 or 3.

While the plug portion 33 of the inner ring 12 is inserted into one of the ports 15 of the joint body 11, the union nut 13 is screwed to the joint body 11. Finally, the union nut 13 is fastened until the pressing portion 45 presses the tube 2 or 3 toward the bulging portion 36 by predetermined force.

The plug portion 33 is press-fitted into the groove 29 to form the first sealing region 41, in which sealing force acts in a radial direction. Further, the contact portion 34 is pressed against the inner sleeve 23 to form the second sealing region 42, in which sealing force acts in an axial direction.

Next, a method for manufacturing the resin pipe joint 1 will now be described with reference to the drawings.

The method for manufacturing the resin pipe joint 1 includes a preparation step, a combination step, a supply step, and a solidification step. Note that the method for manufacturing the resin pipe joint 1 means a method for manufacturing the joint body 11.

Figure 3:
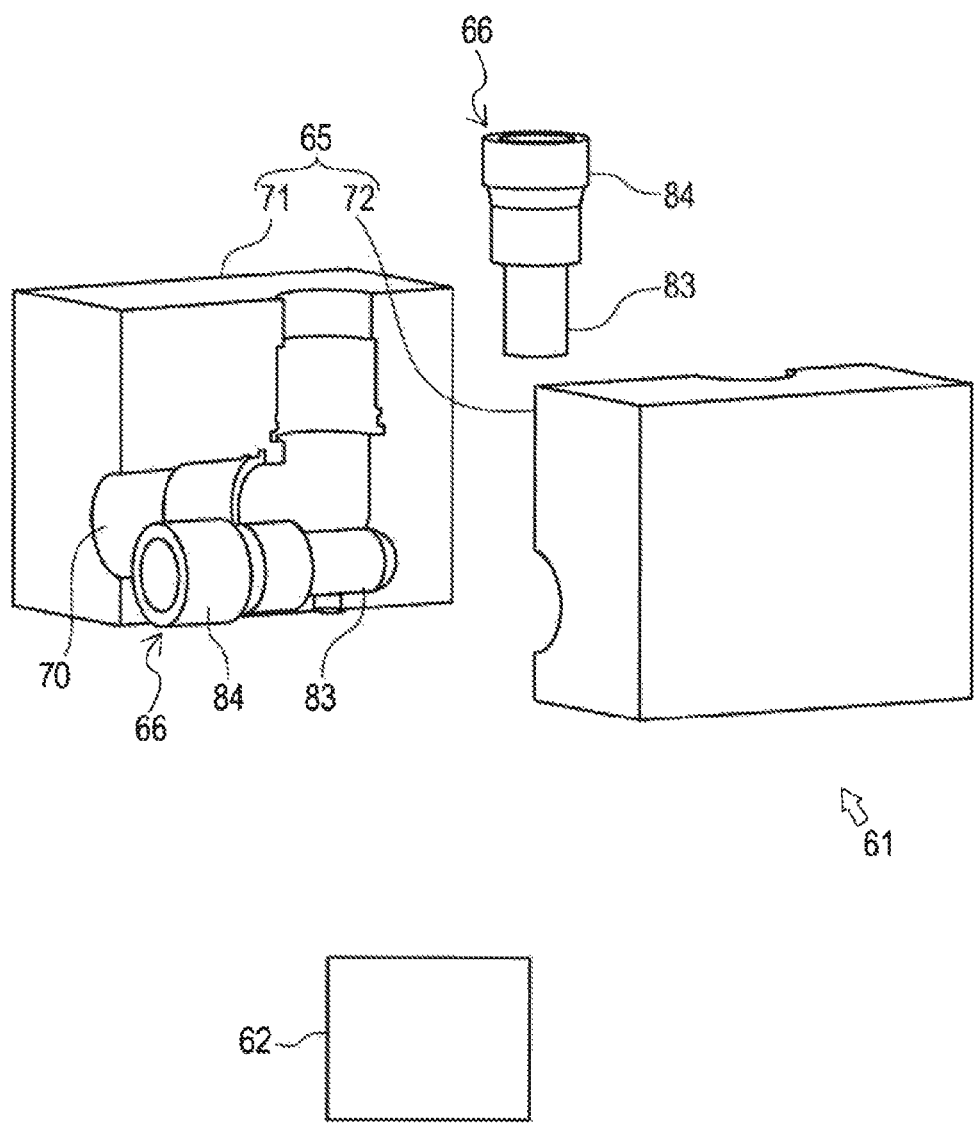
FIG. 3 is a schematic view of a preparation step in the method for manufacturing a resin pipe joint according to the first embodiment of the present invention.
Figure 4:
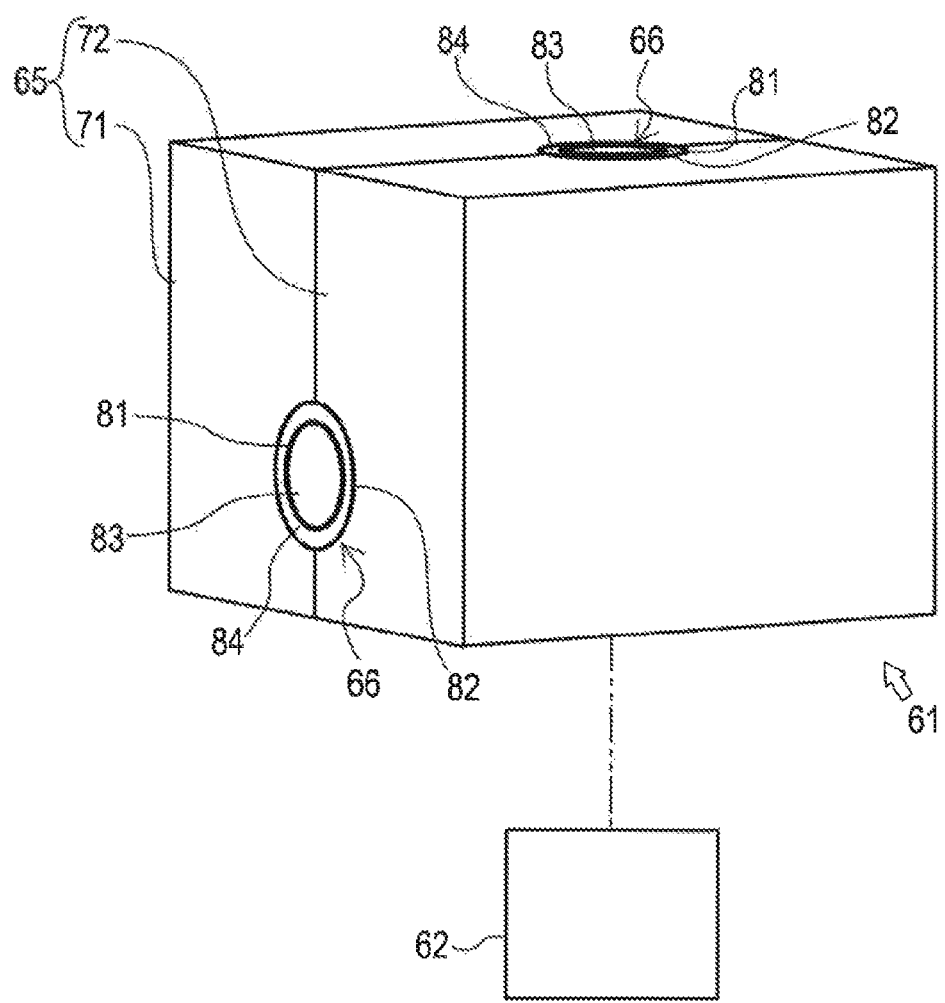
FIG. 4 is a schematic view of a combination step in the method for manufacturing a resin pipe joint according to the first embodiment of the present invention.
Figure 5:
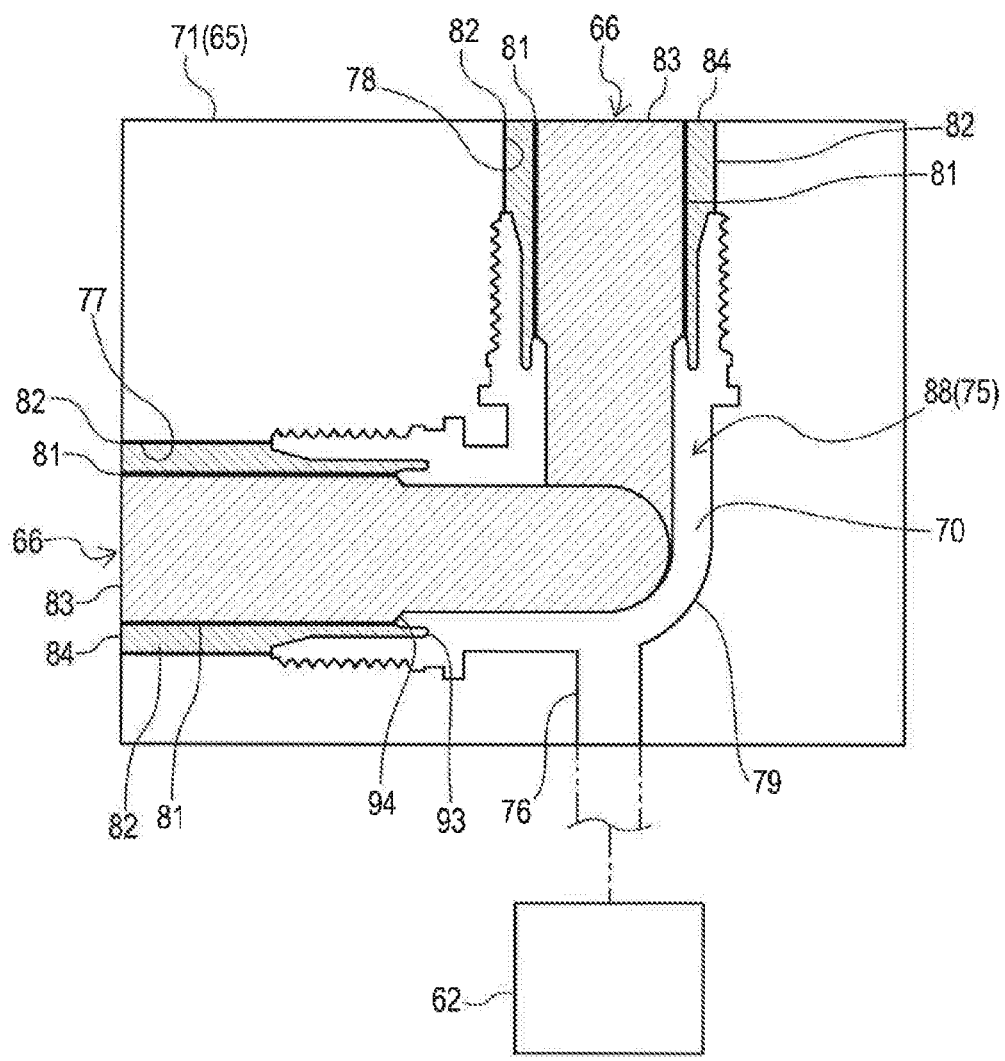
FIG. 5 is a schematic sectional view of the combination step in the method for manufacturing a resin pipe joint according to the first embodiment of the present invention.
Figure 6:
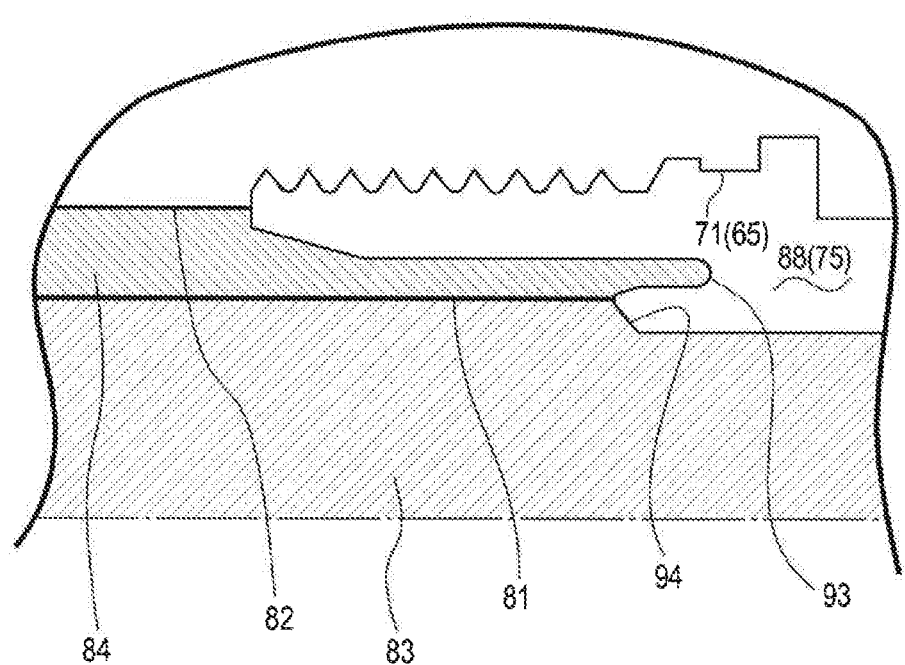
FIG. 6 is a partially enlarged view of FIG. 5.
Figure 7:
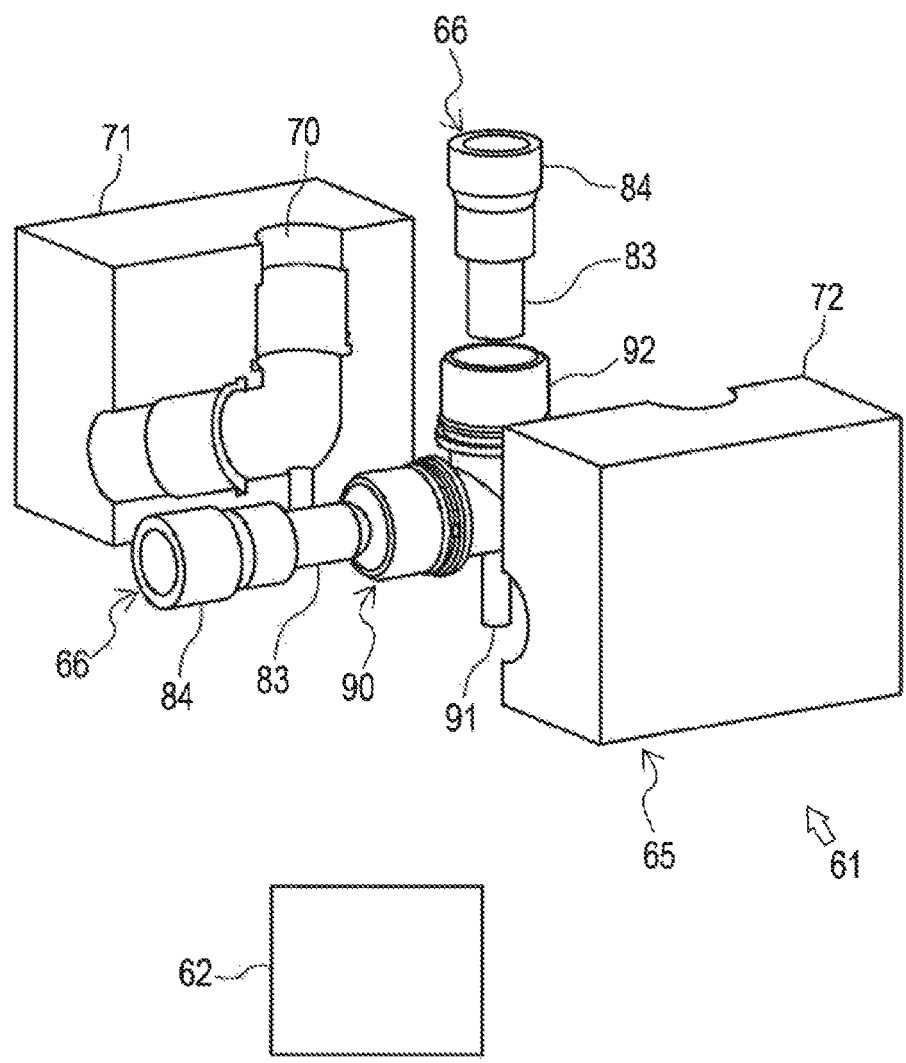
FIG. 7 is a schematic view of a state of a product after a solidification step in the method for manufacturing a resin pipe joint according to the first embodiment of the present invention.

FIG. 3 shows a schematic view of the preparation step. FIG. 4 shows a schematic view of the combination step. FIG. 5 shows a schematic sectional view of the combination step. FIG. 6 shows a partially enlarged view of FIG. 5. FIG. 7 shows a schematic view of a state of a product after the solidification step.

As shown in FIG. 3, a mold 61 and a supply device 62 are prepared in the preparation step. The mold 61 includes a first mold 65 for the outer shape of the joint body 11 and second molds 66 for the inner shape of the joint body 11.

The supply device 62 supplies molten resin to the mold 61. The supply device 62 is detachably connected to the mold 61. As the supply device 62, a known device (such as injection molding machine) can be used.

As the molten resin supplied to the mold 61 by the supply device 62, a fluororesin material such as PFA is preferably used.

The first mold 65 can be divided into a first divided body 71 and a second divided body 72, which each include a recess 70. The first mold 65 includes an internal space 75 and an injection port 76 for resin material. The internal space 75 has a shape, which is substantially ell, corresponding to the joint body 11.

The internal space 75 includes a plurality of insertion ports 77 and 78. The insertion ports 77 and 78 are provided at both ends of the internal space 75 to be exposed to an external space of the first mold 65, i.e. an open space outside the first mold 65. The second molds 66 can be inserted into the internal space 75 to close it.

The injection port 76 connects the vicinity of a bent portion 79 of the internal space 75 with the external space of the first mold 65. The injection port 76 is connectable with the supply device 62 to guide molten resin injected from the supply device 62 into the internal space 75.

In addition, the second molds 66 are the same in number as the insertion ports 77 and 78, i.e. two in this case. The second molds 66 each include a gas-flowing gap or a first gap 81, which, when the second molds 66 are combined with the first mold 65, connects a cavity 88 of the mold 61, which will be described later, to a discharge space outside the cavity 88 and allows gas to flow from the cavity 88 to the discharge space.

The second molds 66 each have a round-pin shape, and each include a shaft-shaped inner mold 83 and an annular outer mold 84. The outer mold 84 is coaxially disposed around the inner mold 83 so that the first gap 81 forms between the outer mold 84 and the inner mold 83.

The inner mold 83 aims at mainly defining the inner surface shape of the body sleeve 21, the inner surface shape of the inner sleeve 23, and the shape of the fluid channel 16. The inner mold 83 can be combined with the first mold 65 to extend between the insertion port 77 or 78 and the bent portion 79 of the internal space 75.

The outer mold 84 aims at mainly defining the inner surface shape of the outer sleeve 22 and the outer surface shape of the inner sleeve 23. The outer mold 84 is externally fitted to the first axial side of the inner mold 83 and can be combined with the first mold 65 to close the insertion port 77 or 78 in cooperation with the inner mold 83 to prevent leakage of molten resin.

The first gap 81 is a fine gap and has a circular shape to extend along the entire circumference of the outer peripheral surface of the inner mold 83 and the outer peripheral surface of the outer mold 84. The outer peripheral surfaces face each other. The first gap 81 penetrates each of the second molds 66 to extend in the axial direction (cf. FIGS. 5 and 6).

As shown in FIGS. 4 and 5, the second molds 66 are combined with the first mold 65 in the combination step so that the cavity 88, into which molten resin can be injected from the supply device 62, forms inside the mold 61.

In this step, for example, the first mold 65 is divided to expose the recess 70 of each of the first divided body 71 and the second divided body 72. Then, following the shape of the cavity 88, the second molds 66 are disposed inside the recess 70 (cf. FIG. 5), and then the first divided body 71 is united with the second divided body 72.

In this manner, the cavity 88 forms in the mold 61. At the same time, the first gap 81 between the inner mold 83 and the outer mold 84, which are coaxially overlapped with each other, is disposed to extend from the cavity 88 to the discharge space, i.e. the external space of the mold 61.

In this step, another gas-flowing gap or a second gap 82 can be disposed with a configuration similar to that of the first gap 81 to extend from the cavity 88 to the external space of the mold 61. The second gap 82 forms between the first mold 65 and each of the second molds 66 by combination of the first mold 65 and the second molds 66.

The second gap 82 is disposed outside the first gap 81 and connects with the cavity 88 at a position different from the position where the first gap 81 connects with the cavity 88. The second gap 82 is formed annularly (circularly) to extend along the entire circumference of the outer peripheral surface of the outer mold 84 and the inner surface of the recess 70. The surfaces face each other.

Thus, in the step of combining the second mold 66 with the first mold 65, a plurality of gaps, namely, the first gaps 81 and the second gaps 82 are formed in the mold 61 so that the cavity 88 can be connected to the external space of the mold 61 at a plurality of locations.

In the supply step, molten resin is supplied from the supply device 62 to the cavity 88 in the mold 61. The molten resin is injected from the injection port 76 into the cavity 88 and flows from the vicinity of the bent portion (central portion) 79 toward both ends.

To prevent the leakage of molten resin from the cavity 88 in the supply step, it is preferable that the first gaps 81 and the second gaps 82 can each hold flow of molten resin as much as possible. In other words, the first gaps 81 and the second gaps 82 preferably facilitate discharge of unnecessary gas and inhibit infiltration of molten resin.

In the solidification step, molten resin in the cavity 88 is solidified after stop of the supply of molten resin from the supply device 62. The molten resin is solidified by using appropriate means, for example, leaving the molten resin at room temperature inside the cavity 88 so that the molten resin is cooled.

After the solidification step, the mold 61 is opened and a molded article 90 is taken out, as shown in FIG. 7. Then, an extra part 91 made of resin along the shape of the injection port 76 is removed from a body part 92 by cutting means. In this manner, the joint body 11 of the resin pipe joint 1 is obtained.

In the supply step according to the manufacturing method, discharge of gas generated in the cavity 88 due to injection of molten resin, and/or gas (air) existing in the cavity 88 before the supply of molten resin, to an external space of the mold 61 through the first gaps 81 (and the second gaps 82) follows infiltration of molten resin into the cavity 88.

Therefore, when molten resin is supplied to the cavity 88, it is possible to prevent the above-described unnecessary gas from staying in the cavity 88. This can ensure favorable properties of the cavity 88 filled with molten resin and reduce molding defects. As a result, it is possible to improve the quality of the joint body 11 and further the resin pipe joint 1.

Although the discharge space according to the present invention is an external space of the mold 61, namely, an open space outside the mold 61 in the first embodiment, the discharge space is not limited to the external space. The discharge space only has to be a volume in which gas discharged from the cavity 88 through the gas-flowing gaps is stored.

The second mold 66 has the shaft-shaped inner mold 83 and the annular outer mold 84, as described above. The outer mold 84 is coaxially disposed around the inner mold 83 so that the first gap 81 forms between the outer mold 84 and the inner mold 83.

Therefore, it is possible to relatively easily obtain the second mold 66 with the first gaps 81. Furthermore, after the combination step, the end of the first gap 81 can be annularly exposed to the cavity 88, and the above-described gas can be effectively discharged.

The second molds are combined with the first mold in formation of the cavity 88 so that the first gaps 81 are exposed to the cavity 88 at the positions of the cavity 88 that are deviated from the position facing the region where the constituent part of the sealing regions in the joint body 11 is formed.

In other words, the combination step is progressed so that boundaries between the adjacent molds are not located on a virtual line extending in an axial direction from the region. This prevents traces of parting lines from being left in the sealing regions in the manufactured joint body 11.

As shown in FIGS. 2 and 5, the second molds 66 are combined with the first mold 65 under the condition that the first gaps 81 are positioned such that each outer mold 84 can solely form the outer periphery of the inner sleeve 23 for the first sealing region 41 and each inner mold 83 can solely form the tip 26 of the inner sleeve 23 for the second sealing region 42.

As shown in FIG. 6, the mold 61 form the outer peripheral surface of the inner sleeve 23 in the first sealing region 41 by using a tip 93 on the outer mold 84. The mold 61 form the tip 26 of the inner sleeve 23 in the second sealing region 42 by using a step portion 94 in the inner mold 83.

In this case, the first gaps 81 are disposed in the second molds 66 so that one end of each first gap 81 is exposed to a region of the cavity 88 for the inner sleeve 23, namely, a narrow end of the cavity 88 apart from the injection port 76 or the bent portion 79.

This can prevent traces of parting lines from remaining in the first sealing regions 41 and the second sealing regions 42, and thus, prevent traces of parting lines from adversely affecting sealing performance between the joint body 11 and the inner ring 12. In addition, it is possible to effectively prevent gas from staying in the narrow end of the cavity 88, and prevent shape defects of the grooves 29 in the narrow end. Therefore, the resin pipe joint 1 can surely achieve favorable sealing properties.

Each second mold 66 has the first gap 81 so that traces of parting lines remain at radius between the first sealing region 41 and the second sealing region 42, but the second molds according the present invention are not limited to such a structure.

Although the method of the first embodiment manufactures the resin pipe joint 1 as a simple item, this does not provides any limitation to a method for manufacturing a resin pipe joint according to the present invention. The method can also manufacture a resin pipe joint other than a simple item, i.e. one integrated with a fluid device such as a valve or a filter.

Figure 8:
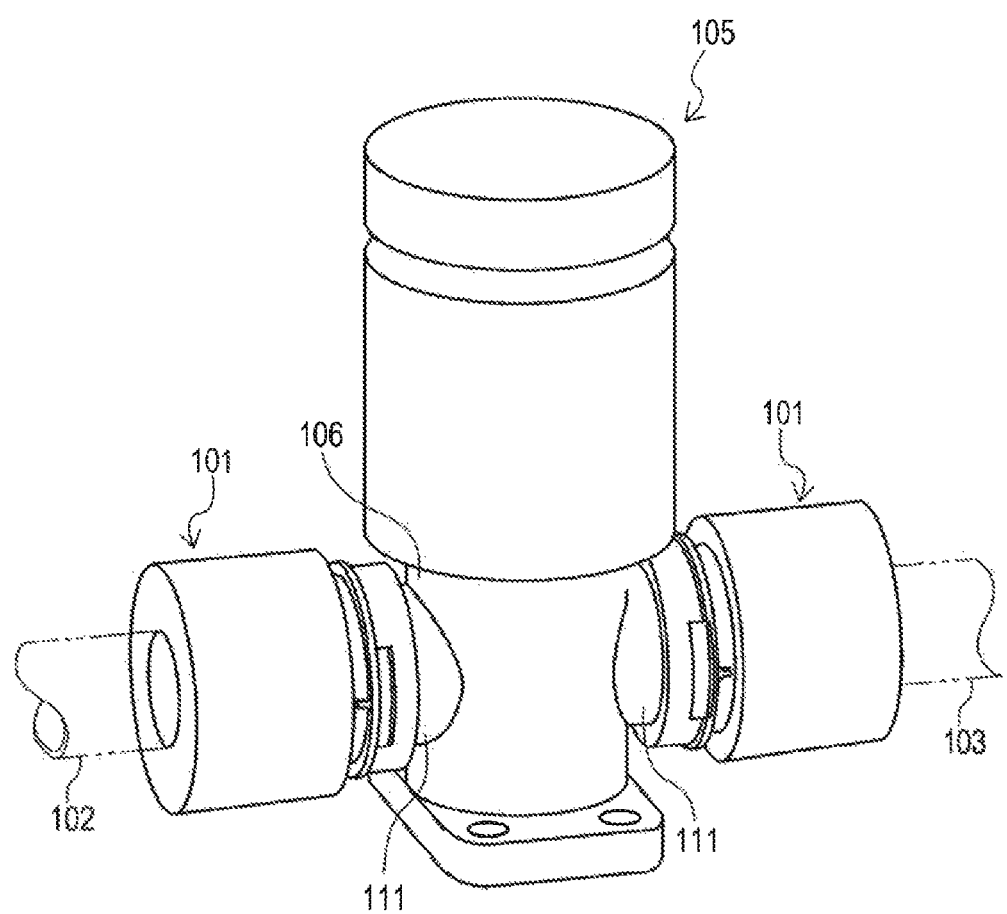
FIG. 8 is a perspective view of a resin pipe joint manufactured by a method according to a second embodiment of the present invention.

For example, a method according to a second embodiment of the present invention can manufacture a resin pipe joint 101, as shown in FIG. 8. The resin pipe joint 101 has a joint body 111 formed integrally with a body 106 of a valve 105, i.e. a part of a fluid device, so that the valve 105 is connectable with two tubes 102 and 103.

Figure 9:
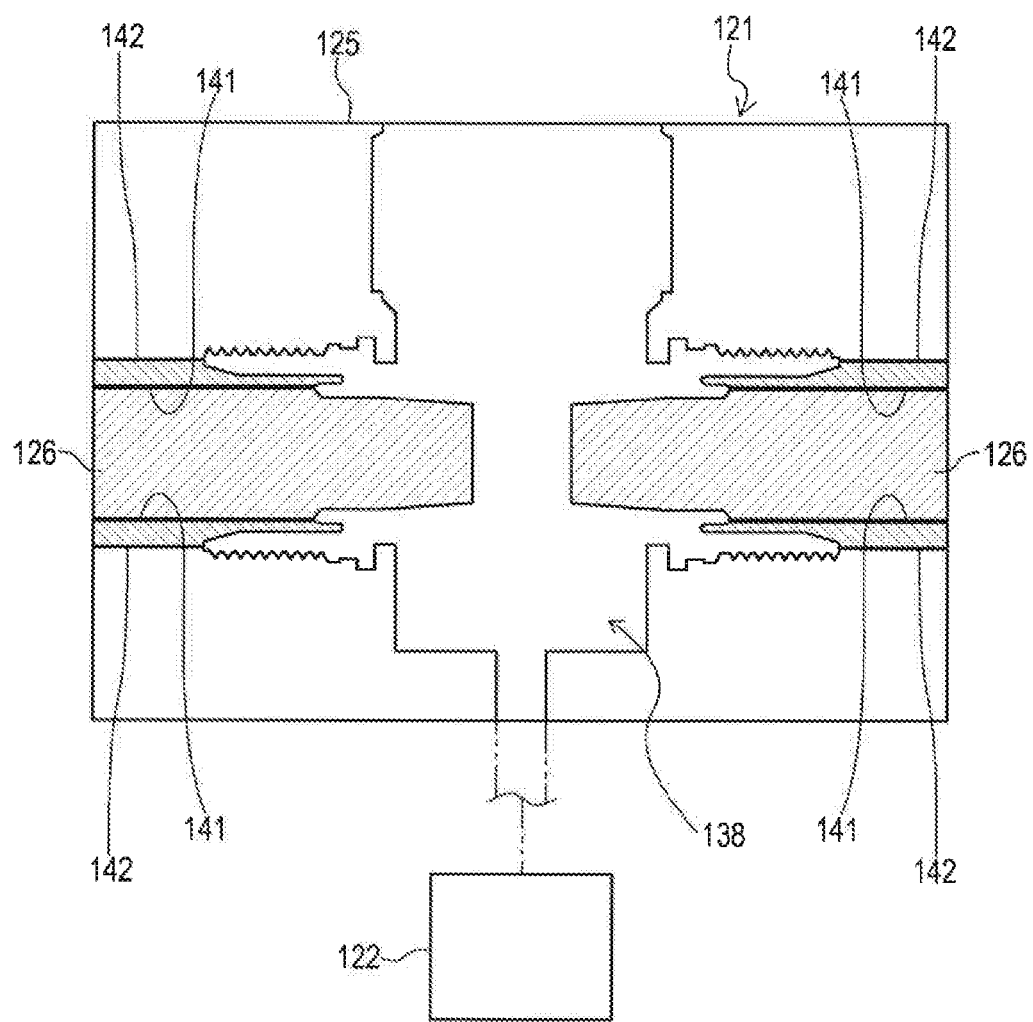
FIG. 9 is a schematic sectional view of a combination step in the method for manufacturing a resin pipe joint according to the second embodiment of the present invention.
Figure 10:
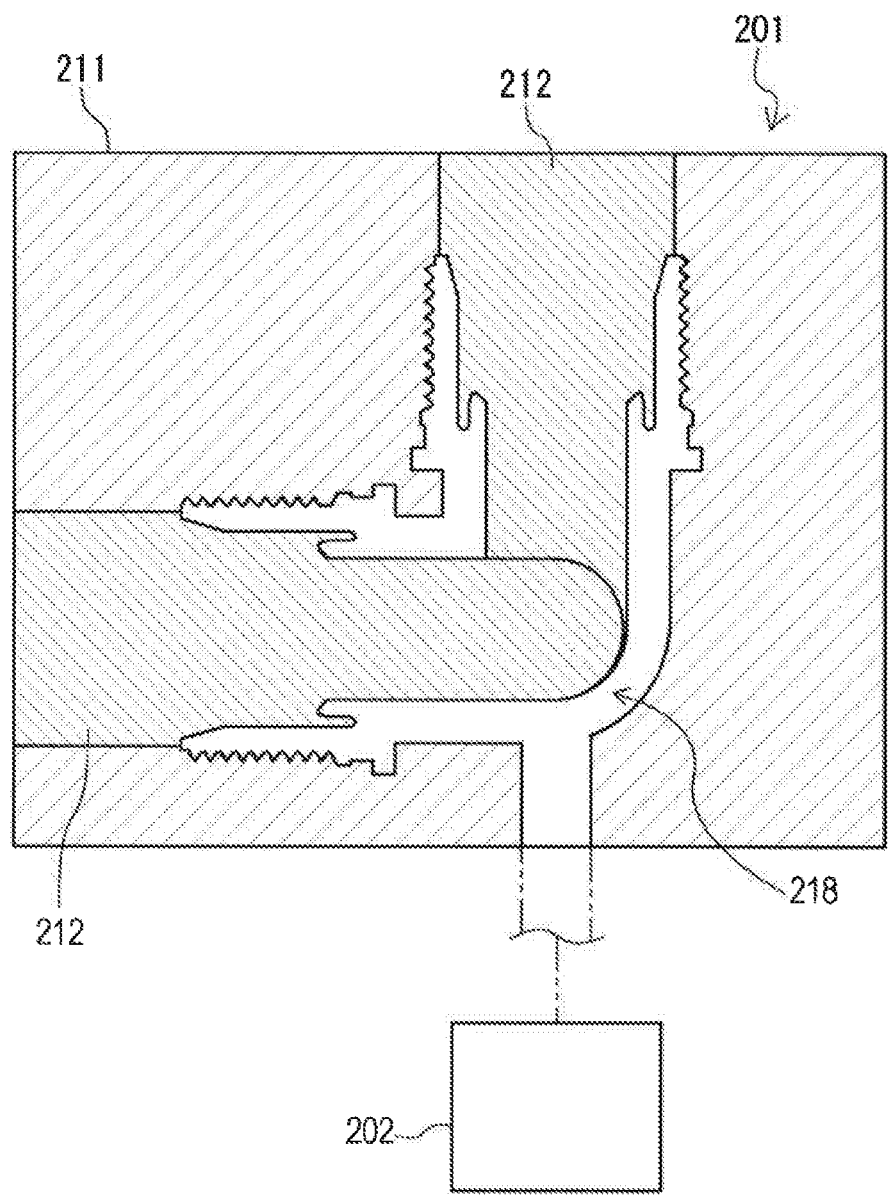
FIG. 10 is a schematic sectional view of a combination step in a conventional method for manufacturing a resin pipe joint.

Specifically, in the preparation step, a mold 121 and a supply device 122 are prepared (cf. FIG. 9). The mold 121 includes a first mold 125 for the outer shape of the joint body 111 and second molds 126 for the inner shape of the joint body 111.

The second molds 126 each has a first gap 141 as a gas-flowing gap that connects a cavity 138 inside the mold 121 to a discharge space outside the cavity 138 and allows gas to flow when the second molds 126 are combined with the first mold 125.

Hence, in the combination step, the first gap 141 can be disposed in the mold 121. Therefore, the method of the second embodiment can achieve a functional effect similar to that of the method of the first embodiment. Further, a second gap 142 can also be disposed as another gas-flowing gap.

DESCRIPTION OF REFERENCE NUMERALS

1: resin pipe joint; 2: tube; 3: tube; 11: joint body; 12: inner ring; 13: union nut; 15: port; 16: fluid channel; 21: main sleeve; 22: outer sleeve; 23: inner sleeve; 29: groove; 31: insert portion; 32: fitting portion; 33: plug portion; 34: contact portion; 61: mold; 62: supply device; 65: first mold; 66: second mold; 81: first gap; 83: inner mold; 84: outer mold; 88: cavity; 101: resin pipe joint; 102: tube; 103: tube; 111: joint body; 121: mold; 122: supply device; 125: first mold; 126: second mold; 138: cavity.

What is claimed is:

1. A method for manufacturing a resin pipe joint with a joint body and an inner ring, the joint body connectable to a tube, the joint body including:
   a plurality of ports;
   a fluid channel that connects the ports to each other;
   a main sleeve including a part of the fluid channel;
   an outer sleeve projected from the main sleeve coaxially in a first axial direction;
   an inner sleeve disposed inside the outer sleeve and projected from the main sleeve coaxially in the first axial direction so that a tip of the inner sleeve is closer to the main sleeve than a tip of the outer sleeve; and
   a groove surrounded by the main sleeve, the outer sleeve, and the inner sleeve and open in the first axial direction,
   the inner ring capable of being coupled to the joint body to connect the tube to at least one of the ports of the joint body, the inner ring including:

a tubular insert portion insertable into the outer sleeve;
a tubular plug portion coaxially projected from the insert portion in a second axial direction and to be press-fitted into the groove to form a first sealing region between the plug portion and an outer periphery of the inner sleeve; and
a tubular contact portion disposed inside the plug portion and projected from the insert portion in the second axial direction so that a tip of the contact portion is closer to the insert portion than a tip of the plug portion, the contact portion to be pressed against the tip of the inner sleeve to form a second sealing region between the contact portion and the tip of the inner sleeve, the method comprising:
preparing a mold and a supply device configured to supply molten resin to the mold, the mold including a first mold for an outer shape of the joint body and a second mold for an inner shape of the joint body, the second mold having:
a shaft-shaped inner mold configured to define inner surface shapes of the main sleeve and the inner sleeve, an outer peripheral surface of the inner mold having a step portion configured to define an inner peripheral surface of the tip of the inner sleeve; and
an annular outer mold disposed around the inner mold and configured to define an inner surface shape of the outer sleeve and an outer surface shape of the inner sleeve, the outer mold having a tip portion disposed around the step portion of the inner mold and configured to define an outer peripheral surface of the tip of the inner sleeve;
combining the second mold with the first mold to form inside the mold a cavity into which the molten resin from the supply device is injectable, and to form a first gap between a first area of the outer peripheral surface of the inner mold and a second area of an inner peripheral surface of the outer mold and a second gap between the first mold and the second mold, the first area extending from the step portion in the first axial direction and the second area extending from the tip portion in the first axial direction,
the first gap and the second gap serving as a gas-flow gap that connects the cavity to a discharge space outside the cavity and allows gas to flow,
the first gap configured to be open to a volume of the cavity for a boundary between outer and inner peripheries of the tip of the inner sleeve,
the second gap configured to be open to a volume of the cavity for the outer sleeve;
supplying the molten resin from the supply device to the cavity in the mold; and
solidifying the molten resin in the cavity after stop of the supply of the molten resin from the supply device.

2. The method according to claim 1, wherein
the outer sleeve includes a thread on an outer periphery,
the inner ring includes a tubular fitting portion projected from the insert portion in the first axial direction and to be press-fitted into one longitudinal end of the tube, and
the resin pipe joint includes a union nut configured to be fastened to the thread of the outer sleeve to maintain the inner ring, which is press-fitted in the longitudinal end of the tube, at a position where the inner ring is coupled to the joint body.

3. The method for manufacturing a resin pipe joint according to claim 1, wherein the molten resin is a fluororesin material.

* * * * *